(12) United States Patent
Shoei et al.

(10) Patent No.: US 11,301,046 B2
(45) Date of Patent: Apr. 12, 2022

(54) ELECTRONIC APPARATUS, INFORMATION PROCESSING DEVICE, AND INFORMATION PROCESSING METHOD

(71) Applicant: Sony Corporation, Tokyo (JP)

(72) Inventors: Akihiro Shoei, Miyagi (JP); Tomoko Katsuhara, Kanagawa (JP); Ichirou Higuchi, Kanagawa (JP); Takeshi Koizumi, Miyagi (JP); Norikatu Ito, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/632,174

(22) PCT Filed: Jun. 6, 2018

(86) PCT No.: PCT/JP2018/021656
§ 371 (c)(1),
(2) Date: Jan. 17, 2020

(87) PCT Pub. No.: WO2019/017099
PCT Pub. Date: Jan. 24, 2019

(65) Prior Publication Data
US 2020/0225752 A1 Jul. 16, 2020

(30) Foreign Application Priority Data
Jul. 20, 2017 (JP) .............................. JP2017-140974

(51) Int. Cl.
*G06F 3/01* (2006.01)
(52) U.S. Cl.
CPC .................... *G06F 3/016* (2013.01)

(58) Field of Classification Search
CPC ........ G06F 3/016; G06F 3/017; G06F 3/0346; G06F 3/041; G06F 3/0445; G06F 3/01; H01H 36/00
See application file for complete search history.

(56) References Cited

U.S. PATENT DOCUMENTS 8,432,368 B2 * 4/2013 Momeyer ............. G06F 1/1684
345/173
9,507,473 B2 * 11/2016 Zhao ...................... G06F 3/041
(Continued)

FOREIGN PATENT DOCUMENTS

JP  2004-177993      6/2004
JP  2004-177993 A    6/2004
(Continued)

OTHER PUBLICATIONS

International Search Report issued in connection with PCT/JP2018/021656, dated Jul. 24, 2018. (2 pages).

*Primary Examiner* — Jeff Piziali
(74) *Attorney, Agent, or Firm* — K&L Gates LLP (57) ABSTRACT

An electronic apparatus according to an embodiment of the present technology includes an apparatus body, a pressure detector, and a controller. The apparatus body includes a principal surface, and a peripheral surface that is held by a user. The pressure detector is arranged on the peripheral surface, and detects a holding force that acts on the peripheral surface. The controller controls an operation of the apparatus body according to a temporal change in the holding force detected by the pressure detector.

11 Claims, 10 Drawing Sheets

(56) References Cited

U.S. PATENT DOCUMENTS

| | | | | |
|---|---|---|---|---|
| 10,742,798 B1* | 8/2020 | Hughes | ............... | G06F 11/3013 |
| 2008/0018611 A1* | 1/2008 | Serban | ................ | H03K 17/975 |
| | | | | 345/173 |
| 2009/0312051 A1* | 12/2009 | Hansson | ........... | H04M 1/72522 |
| | | | | 455/556.1 |
| 2011/0167391 A1* | 7/2011 | Momeyer | ............... | G06F 3/038 |
| | | | | 715/863 |

FOREIGN PATENT DOCUMENTS

| | | |
|---|---|---|
| JP | 2006-018505 | 1/2006 |
| JP | 2006-018505 A | 1/2006 |
| JP | 2011-223285 | 11/2011 |
| JP | 2011-223285 A | 11/2011 |
| JP | 2013-516703 | 5/2013 |
| JP | 2013-516703 A | 5/2013 |
| JP | 2014-179800 | 9/2014 |
| JP | 2014-179800 A | 9/2014 |
| JP | 2015-056005 | 3/2015 |

* cited by examiner

| Grip time | | | Function to be operated |
|---|---|---|---|
| 1st time | 2nd time | 3rd time | |
| 0 (Short) | 0 | 0 | Call for A |
| 0 | 0 | 1 (Long) | Call for B |
| 0 | 1 | 0 | Call for C |
| 0 | 1 | 1 | Start of sound recording |
| 1 | 0 | 0 | Screen shot |
| 1 | 0 | 1 | Shooting with camera |
| 1 | 1 | 0 | Start of video shooting |
| 1 | 1 | 1 | Light turned on |

FIG.7A

| Grip force | | | Function to be operated |
|---|---|---|---|
| 1st time | 2nd time | 3rd time | |
| 0 (Weak) | 0 | 0 | Call for A |
| 0 | 0 | 1 (Strong) | Call for B |
| 0 | 1 | 0 | Call for C |
| 0 | 1 | 1 | Start of sound recording |
| 1 | 0 | 0 | Screen shot |
| 1 | 0 | 1 | Shooting with camera |
| 1 | 1 | 0 | Start of video shooting |
| 1 | 1 | 1 | Light turned on |

|  |  | Time | |
|---|---|---|---|
|  |  | Grip for short time (short press) | Grip for long time (long press) |
| Grip force | Grip gently | Audio time-guidance | Screen shot |
|  | Grip tightly | Shooting with camera | Start of video shooting |

FIG.10

|  |  | Grip force | |
|---|---|---|---|
|  |  | Grip tightly | Grip gently |
| Pose state | Display section situated above | NFC started | — |
|  | Speaker situated above | Volume increased | Volume decreased |
|  | Rapid movement | SNS started | — |

— # ELECTRONIC APPARATUS, INFORMATION PROCESSING DEVICE, AND INFORMATION PROCESSING METHOD

TECHNICAL FIELD

The present technology relates to an electronic apparatus that can be manipulated with one hand, an information processing device, and an information processing method.

BACKGROUND ART

Portable electronic apparatuses such as a smartphone have been widely spread. In recent years, as a sensor used for an electronic apparatus, a sensor is known that has a configuration that makes it possible to detect an operation position and a pressing force on an input operation surface on which an input operation is performed by an operating member (for example, refer to Patent Literature 1).

CITATION LIST

Patent Literature

Patent Literature 1: Japanese Patent Application Laid-open No. 2015-56005

DISCLOSURE OF INVENTION

Technical Problem

Electronic apparatuses such as a smartphone are typically manipulated through an input manipulation surface of a display section or a physical switch of its body.
However, depending on the usage environment and the usage form, there may be difficulty in a manipulation performance, and this may result in a malfunction.

In view of the circumstances described above, it is an object of the present technology to provide an electronic apparatus, an information processing device, and an information processing method that make it possible to obtain a desired function with a simpler manipulation.

Solution to Problem

An electronic apparatus according to an embodiment of the present technology includes an apparatus body, a pressure detector, and a controller.

The apparatus body includes a principal surface, and a peripheral surface that is held by a user.

The pressure detector is arranged on the peripheral surface, and detects a holding force that acts on the peripheral surface.

The controller controls an operation of the apparatus body according to a temporal change in the holding force detected by the pressure detector.

The electronic apparatus makes it possible to perform a specified input manipulation by a grip manipulation being performed with respect to the apparatus body. This makes it possible to provide a desired function using a simpler manipulation.

The electronic apparatus may further include a storage that stores therein a pattern of the temporal change in the holding force associated with the operation of the apparatus body, and the controller may include a determination section and a checkup section. The determination section determines whether there is a grip manipulation with respect to the apparatus body according to an output from the pressure detector. The checkup section checks the grip manipulation against the pattern of the temporal change, the pattern of the temporal change corresponding to the grip manipulation.

It is possible to perform various manipulations just using the grip manipulation, by storing a plurality of the patterns of the temporal change, the patterns of the temporal change being patterns corresponding to the grip manipulation.

The pattern of the temporal change may include information regarding a manipulation time of the grip manipulation, or may include information regarding a pressing force of the grip manipulation, or may include both of them.

The electronic apparatus may further include an acceleration detector that detects an acceleration that acts on the apparatus body, and the controller may be configured to control the operation of the apparatus body according to an output from the pressure detector and an output from the acceleration detector.

The pressure detector may include an electrostatic pressure-sensitive sensor that includes a plurality of capacitive elements arranged along the peripheral surface.

The apparatus body may further include a display section that is arranged on the principal surface.

An information processing device includes a determination section, a storage, and a checkup section.

The determination section determines whether there is a grip manipulation with respect to an apparatus body according to an output from a pressure detector that detects a holding force that acts on the apparatus body.

The storage stores therein a pattern of a temporal change in the holding force associated with an operation of the apparatus body.

The checkup section checks the grip manipulation against the pattern of the temporal change, the pattern of the temporal change corresponding to the grip manipulation.

An information processing method includes determining whether there is a grip manipulation with respect to an apparatus body according to an output from a pressure detector that detects a holding force that acts on the apparatus body.

The grip manipulation is checked against a pattern of a temporal change in the holding force associated with an operation of the apparatus body.

A control signal is generated that starts the operation corresponding to the pattern of the temporal change in the holding force.

Advantageous Effects of Invention

As described above, the present technology makes it possible to obtain a desired function with a simpler manipulation.

Note that the effect described here is not necessarily limitative and may be any effect described in the present disclosure.

MODE(S) FOR CARRYING OUT THE INVENTION

Embodiments according to the present technology will now be described below with reference to the drawings.

First Embodiment

[Entire Configuration]

Figure 1:
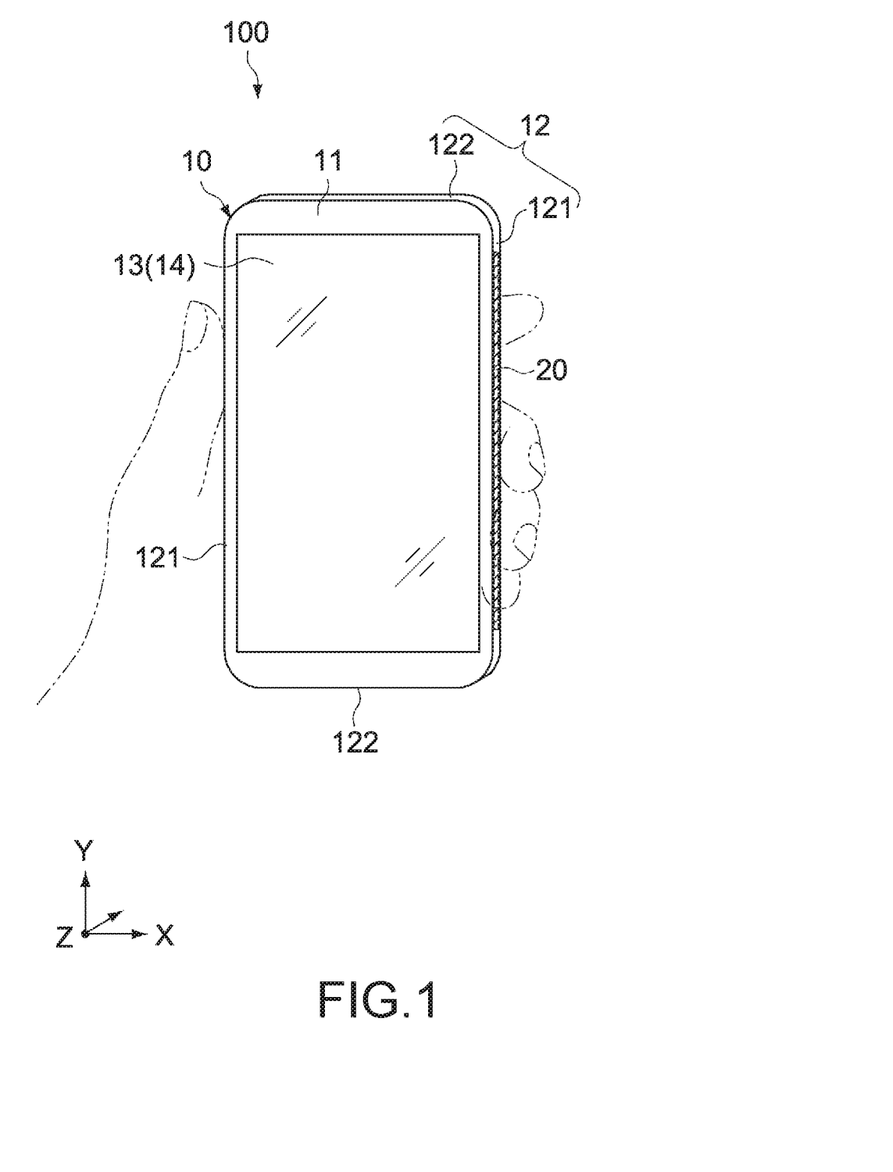
FIG. 1 is a schematic perspective view of an entire configuration of an electronic apparatus according to an embodiment of the present technology.
Figure 2:
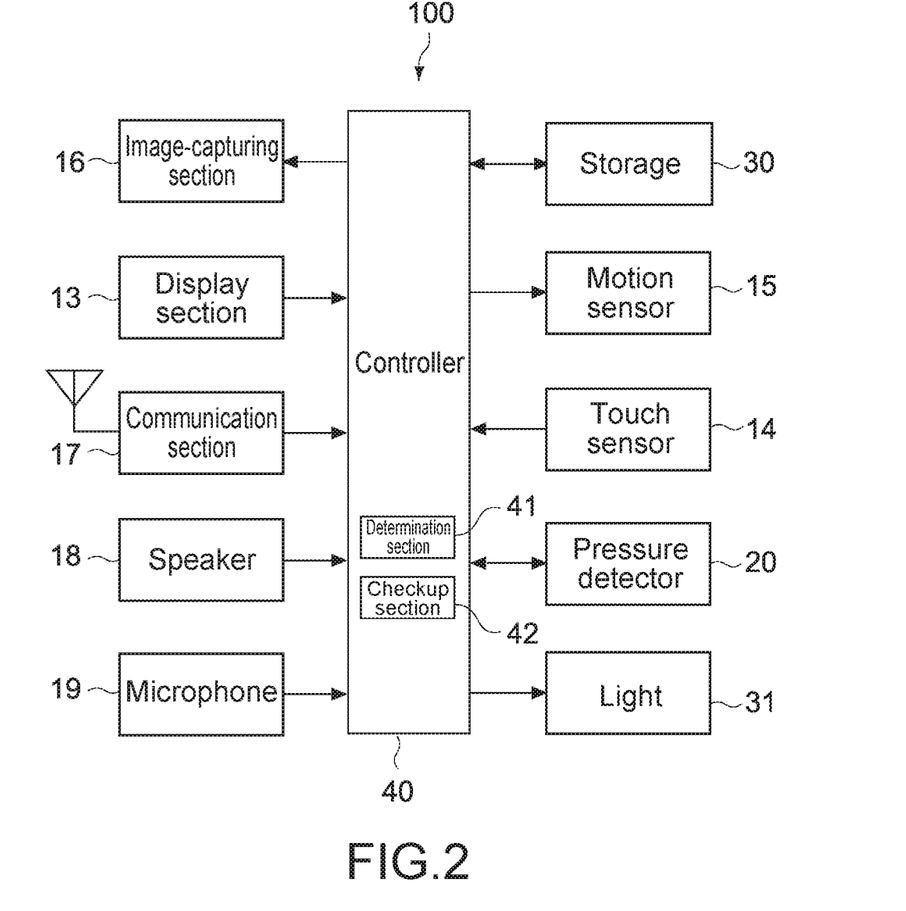
FIG. 2 is a functional block diagram illustrating the configuration of the electronic apparatus.

FIG. 1 is a schematic perspective view of an entire configuration of an electronic apparatus 100 according to an embodiment of the present technology. FIG. 2 is a functional block diagram illustrating the configuration of the electronic apparatus 100.

The electronic apparatus 100 is typically a smartphone. As illustrated in FIG. 1, the electronic apparatus 100 includes an apparatus body 10 having a size that can be held by a user with one hand. The apparatus body 10 has a substantially rectangular shape, where an X-axis direction corresponds to its side in the lateral direction and a Y-axis direction corresponds to its side in the longitudinal direction, as viewed from the front.

The apparatus body 10 includes a principal surface 11 that is situated in the front, and a peripheral surface 12 that is held by a user.

A display section 13 is arranged over a large portion of the principal surface 11. A touch sensor 14 (refer to FIG. 2) is arranged on the display section 13 in an integrated manner, the touch sensor 14 detecting a position on which manipulation is performed with, for example, the finger of a user or a stylus. Further, an earpiece (not illustrated) is provided near an upper end of the principal surface 11, and a mouthpiece (not illustrated) is provided near a lower end of the principal surface 11.

The display section 13 includes, for example, a liquid crystal display or an electro-luminescence (EL) display. A capacitive sensor is typically used as the touch sensor 14, but the touch sensor 14 is not limited to this. For example, a resistive sensor may be used.

A pressure detector 20 is arranged on the peripheral surface 12. The pressure detector 20 is capable of detecting a user's holding force (a grip manipulation) that acts on the peripheral surface 12. The pressure detector 20 includes a pressure-sensitive sensor capable of detecting a pressing force that acts on the peripheral surface 12, and is typically arranged in a pair of long sides 121 parallel to the Y-axis direction.

The pressure detector 20 includes an electrostatic pressure-sensitive sensor that includes a plurality of capacitive elements arranged along the peripheral surface 12, and is arranged almost all over the long sides 121. This makes it possible to detect a holding force at any position, and thus to detect a grip manipulation without causing a user to become aware of a manipulation position.

Instead of this, the pressure detector 20 may be arranged in a specified region of the long side 121 (for example, in an upper portion, a lower portion, or a central portion). Such a configuration is applicable to an apparatus in which a position of a grip manipulation is designated in advance.

The pressure detector 20 may include single sensors successively arranged in the Y-axis direction, or may include a plurality of sensor groups spaced from one another in the Y-axis direction. The pressure detector 20 may be capable of detecting not only a pressing force but also a pressing position, or may be capable of detecting a plurality of pressing positions at the same time.

Figure 3:
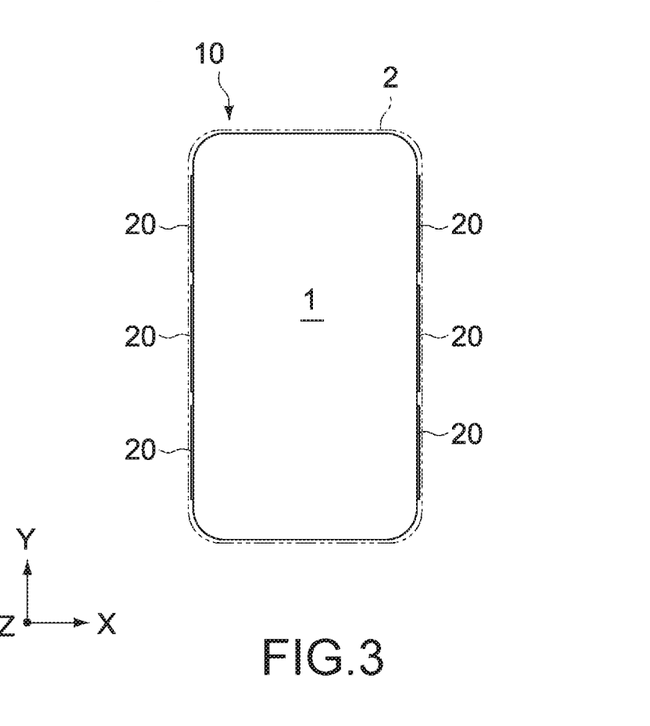
FIG. 3 schematically illustrates a relationship between an apparatus body and a pressure detector in the electronic apparatus, as viewed from the front direction.

FIG. 3 schematically illustrates a relationship between the apparatus body 10 and the pressure detector 20, as viewed from the front direction.

As illustrated in FIG. 3, the pressure detector 20 is provided on a peripheral surface of a housing 1 of the apparatus body 10. The housing 1 is made of metallic material or synthetic resin material, and constitutes the exterior of the apparatus body 10. FIG. 3 illustrates an example of three pressure detectors 20 being arranged in each long side of the housing 1, but of course the configuration is not limited to this. Each pressure detector 20 is covered with a protection cover 2 provided on the peripheral surface of the housing 1. The protection cover 2 is typically made of an elastically deformable material such as rubber or elastomer, and the protection cover 2 protects the apparatus body 10 from a drop impact and transmits a holding force that acts on the apparatus body 10 to the pressure detector 20.

Figure 4:
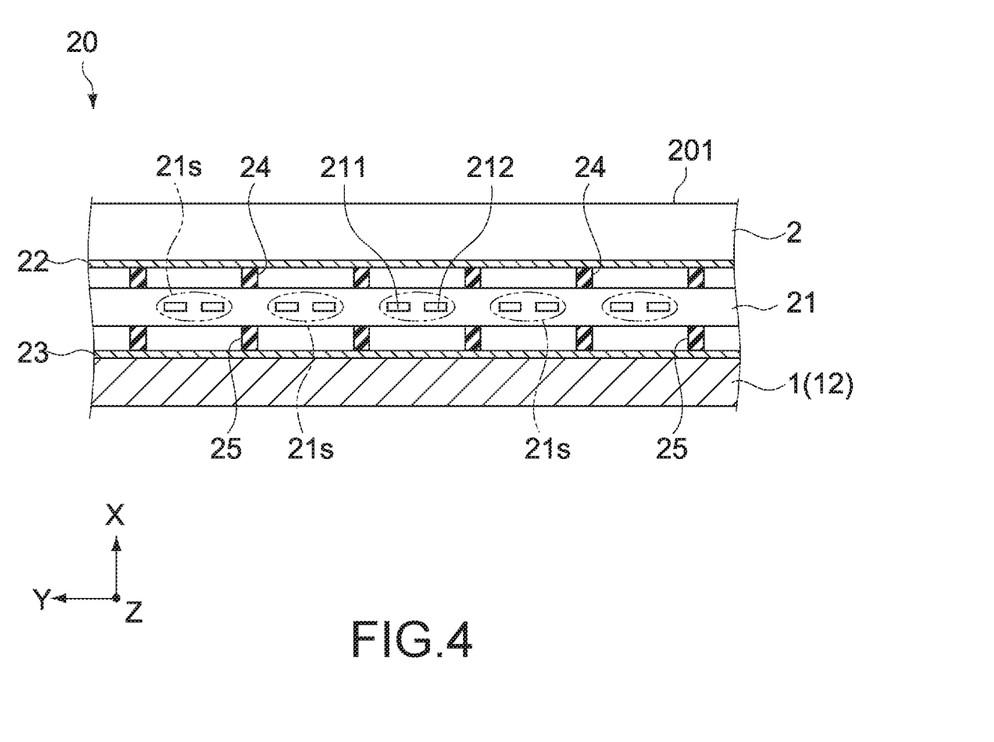
FIG. 4 is a primary-portion cross-sectional view schematically illustrating a structure of the pressure detector.

FIG. 4 is a primary-portion cross-sectional view schematically illustrating a structure of the pressure detector 20.

As illustrated in FIG. 4, the pressure detector 20 is arranged between the housing 1 (the peripheral surface 12 of the apparatus body 10) and the flexible protection cover 2. The pressure detector 20 includes a circuit board 21, a first metal layer 22, a second metal layer 23, a first support 24, and a second support 25.

Figure 5:
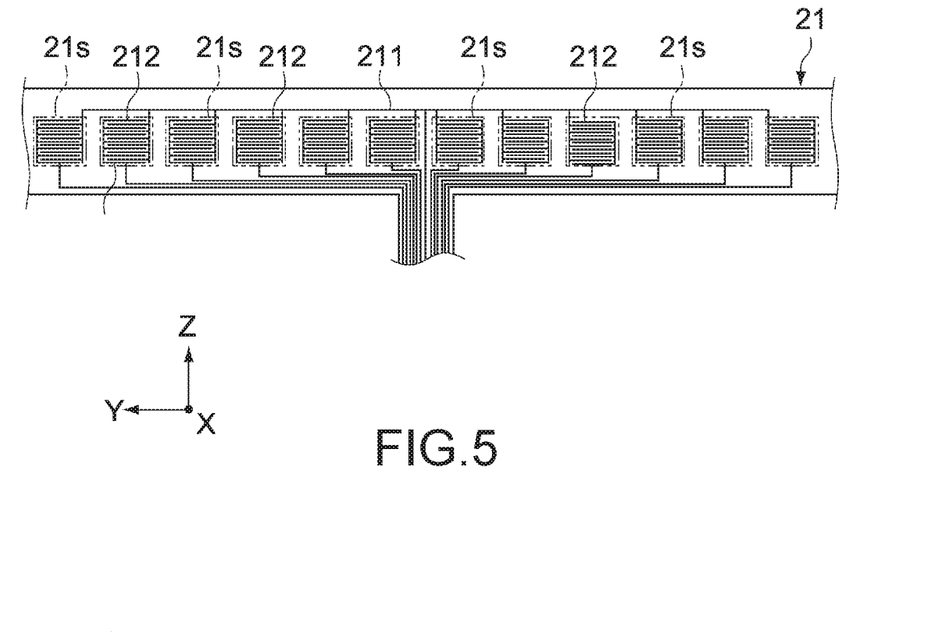
FIG. 5 is a plan view of a primary portion of a circuit board.

FIG. 5 is a plan view of a primary portion of the circuit board 21. The circuit board 21 includes a plurality of capacitive elements 21s arranged in the Y-axis direction. Each capacitive element 21s is configured by a common electrode 211 and an individual electrode 212 being arranged to face each other, the common electrode 211 and the individual electrode 212 each being in the form of comb teeth. Each capacitive element 21s is electrically connected to a controller 40, and is driven by receiving an input signal from the controller 40.

The first and second metal layers 22 and 23 are formed of metallic foil, such as copper foil, that is fixed to an outer surface of the housing 1 (the peripheral surface 12) and to an inner surface of the protection cover 2, and are each typically connected to a ground potential. The first and second supports 24 and 25 are constituted of a plurality of columns elastically deformable in the X-axis direction. The first support 24 is arranged between the first metal layer 22 and the circuit board 21, and the second support 25 is arranged between the second metal layer 23 and the circuit board 21. The first and second supports 24 and 25 are arranged to be aligned across the circuit board 21 in the X-axis direction.

When the pressure detector 20 configured as described above is subjected to a pressing force that acts on a surface 201 of the protection cover 2, a relative distance between the circuit board 21, and the first and second metal layers 22 and 23 is locally changed. An amount of the change is detected according to a change in capacitance between the common electrode 211 and the individual electrode 212 in each capacitive element 21s. Typically, the position of the capacitive element 21s exhibiting a largest amount of a change in capacitance is detected as a position of a pressing manipulation.

In the present embodiment, a mutual-capacitance scheme is used to detect a change in capacitance of each capacitive element 21s. The mutual-capacitance scheme is a scheme for measuring the proximity of a ground electrode of, for example, a human body or a metallic plate, using a change in capacitance between two detection electrodes (the common electrode 211 and the individual electrode 212). The capacitance in the two detection electrodes looks decreased due to the proximity of the grounded human body or metallic plate.

In general, a mutual-capacitance sensor is used for a multi-touchable touch panel. In the multi-touchable touch panel, 160 pairs of detection electrodes can be provided by forming, for example, 16×10 wires in a matrix in an XY direction, and this enables each pair to individually detect the proximity of a finger. As a pressure sensor, it is possible to detect a pressure applied on a metallic surface instead of the proximity of a finger, by covering, with a pressure deformable metallic plate, a surface of the wiring in a matrix in the XY direction to obtain a grounded conductive layer. For example, since the deformation of a metallic plate can be detected for each of the 160 pairs of detection electrodes, it is possible to estimate not only coordinates of a plurality of pressure points in the XY direction, but also a pressure in a Z direction. Here, the provision of the two detection electrodes in the form of comb teeth, as illustrated in FIG. 5, makes it easy to combine the capacitance of the detection electrodes and the capacitance of the metallic plate, and makes it possible to accurately detect a change in capacitance.

Next, as illustrated in FIG. 2, in addition to the display section 13 and the touch sensor 14, the electronic apparatus 100 includes a motion sensor 15, an image-capturing section 16, a communication section 17, a speaker 18, a microphone 19, a storage 30, a light 31, and the controller 40.

The motion sensor 15 is a sensor that detects a pose and a motion of the apparatus body 10. Examples of the motion sensor 15 include an acceleration sensor, an angular rate sensor, a geomagnetic sensor, and an atmospheric-pressure sensor (a combination of at least two thereof may be acceptable). The acceleration sensor may be a three-axis acceleration sensor that is capable of detecting respective accelerations in the directions of three axes. Likewise, the angular rate sensor may be a three-axis sensor that is capable of detecting respective angular rates of rotation about three axes.

The image-capturing section 17 includes an optical system such as an objective or an imaging lens, and an imaging element, such as a complementary metal oxide semiconductor (CMOS) sensor or a charge coupled device (CCD) sensor, that converts, into an electric signal, light captured through the optical system. The image-capturing section 17 generates image data from the signal obtained by the imaging performed by the imaging element, and provides the image data to the controller 40.

The communication section 17 includes a communication module including an antenna, and transmits and receives radio waves for a phone call and radio waves for packet communication such as an email and Web data. The communication section 17 may include a Near-field radio communication (NFC) module.

The speaker 18 includes, for example, a digital-analog converter and an amplifier. The speaker 18 performs a digital-analog conversion process and an amplification process with respect to sound data for a phone call that is input by the controller 40, and outputs sound via the earpiece.

The microphone 19 includes, for example, an analog-digital converter. The microphone 19 converts, into digital sound data, the analog sound data input by a user via the mouthpiece, and outputs the digital sound data to the controller 40. The digital sound data output to the controller 40 is encoded, and then the encoded digital sound data is transmitted through the communication section 17.

The light 31 includes a light-emitting element of a light emitting diode (LED) that is provided at an appropriate position in the apparatus body 10, and is configured such that the light 31 can be turned on by a user's manipulation.

The storage 30 includes a volatile memory used as a work region for the controller 40, and a nonvolatile memory that stores therein various programs necessary for the controller 40 to perform processing. The various programs may be read from a portable recording medium such as an optical disk or a semiconductor memory, or may be downloaded from a server device on a network.

The storage 30 stores therein a pattern of a temporal change in a holding force associated with an operation of the apparatus body 10. The pattern of a temporal change in a holding force typically includes information related to a manipulation time and a pressing force of a grip manipulation that are detected by the pressure detector 20. The manipulation time of a grip manipulation is a time from the start to the termination of the grip manipulation, and, in the present embodiment, the manipulation time of a grip manipulation is referred to when a determination of "long press" or "short press" is performed. On the other hand, the pressing force of the grip manipulation is a magnitude of a pressing force for each grip manipulation (such as a maximum value and an average value), and, in the present embodiment, it is referred to when a determination of "tight grip" or "gentle grip" is performed.

The storage 30 stores therein a plurality of the patterns of a temporal change in a holding force in association with a corresponding operation mode of the apparatus body 10, the pattern including one type of the holding force or a combination of at least two types of the holding forces. The operation mode is not particularly limited, and examples of the operation mode include a phone call mode, an image-capturing mode, data transmission mode, and a light-turning-on mode.

The controller 40 includes, for example, a central processing unit (CPU). The controller 40 performs various operations using various programs stored in the storage 30, and is configured as an information processing device that integrally controls each component of the electronic apparatus 100.

The controller 40 is configured to control an operation of the apparatus body 10 according to a temporal change in a user's holding force detected by the pressure detector 20. In the present embodiment, the controller 40 includes a determination section 41 and a checkup section 42.

The determination section 41 is configured to determine whether there is a grip manipulation with respect to the apparatus body 10 according to an output from the pressure detector 20. The determination section 41 includes an AD converter that converts the output (an analog signal) from the pressure detector 20 into a digital signal. When the output from the pressure detector 20 is a digital signal, the AD converter is omitted.

Figure 6:
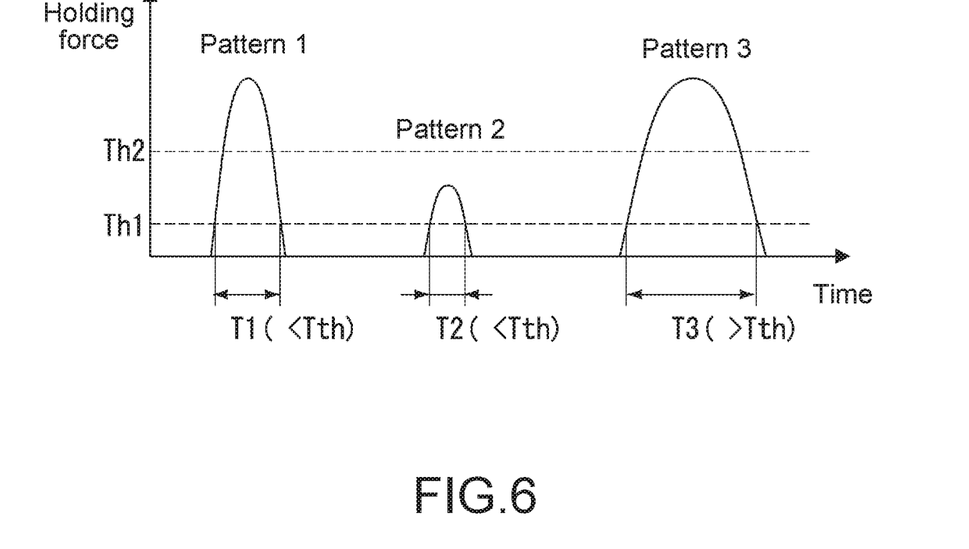
FIG. 6 schematically illustrates an example of an input of a grip manipulation.

FIG. 6 schematically illustrates an example of an input of a grip manipulation, where the horizontal axis represents a time and the vertical axis represents a holding force.

The determination section 41 sets a first threshold Th1 for the output (a signal including an amount of a change in capacitance of the capacitive element 21s, and the same applies hereinafter) from the pressure detector 20, in order to distinguish a holding manipulation from a grip manipulation, the holding manipulation being a user's manipulation of just holding the apparatus body 10, the grip manipulation being a user's manipulation of inputting information to the apparatus body 10. When the output from the pressure detector 20 is greater than the first threshold Th1, the determination section 41 determines that a grip manipulation has been input and performs a checkup process using the checkup section 42. On the other hand, when the output from the pressure detector 20 is less than the first threshold Th1, the determination section 41 determines that the output is not performed due to a grip manipulation, and invalidates the input in order to prevent a malfunction of the electronic apparatus.

Further, the determination section 41 sets a second threshold Th2 for the output from the pressure detector 20, in order to determine whether a user's grip force is strong or weak, the second threshold Th2 being greater than the first threshold Th1. When the output from the pressure detector 20 is not less than the second threshold (for example, refer to patterns 1 and 3 in FIG. 6), the determination section 41 determines that the grip manipulation is "tight grip", and when the output from the pressure detector 20 is not less than the first threshold and not greater than the second threshold (for example, refer to a pattern 2 in FIG. 6), the determination section 41 determines that the grip manipulation is "gentle grip".

The magnitude of the first threshold Th1 is not particularly limited, and an appropriate value (an appropriate amount of a change in capacitance) is set in terms of a manipulation performance and the prevention of a malfunction. The magnitude of the second threshold Th2 is also not particularly limited, and an appropriate value (an appropriate amount of a change in capacitance) is set that makes it possible to differentiate between a tight-grip manipulation and a gentle-grip manipulation.

The second threshold Th2 does not have to be a fixed value, and may dynamically vary depending on, for example, a grip speed. In other words, for example, the determination section 41 may be configured to set the second threshold Th2 to be relatively low when the grip speed is relatively fast, and to set the second threshold Th2 to be relatively high when the grip speed is relatively slow.

Further, the determination section 41 sets a threshold Tth used to determine the duration of a single grip manipulation (hereinafter referred to as a grip time). When the grip time is less than the threshold Tth (for example, refer to the patterns 1 and 2 (times T1 and T2) in FIG. 6), the determination section 41 determines that the grip time exhibits "short press", and when the grip time is not less than the threshold Tth (for example, refer to the pattern 3 (time T3) in FIG. 6), the determination section 41 determines that the grip time exhibits "long press".

The checkup section 42 is configured to check a grip manipulation against a corresponding pattern of a temporal change (hereinafter also referred to as a grip pattern). The grip pattern includes information regarding whether a grip force is strong or weak, or whether a grip time is long or short. Typically, a function of the apparatus body 10 is allocated, the function corresponding to a set of patterns of a combination of a strong grip force and a weak grip force in multiple grip manipulations, or a set of patterns of a combination of a long grip time and a short grip time in multiple grip manipulations.

Figure 7A:
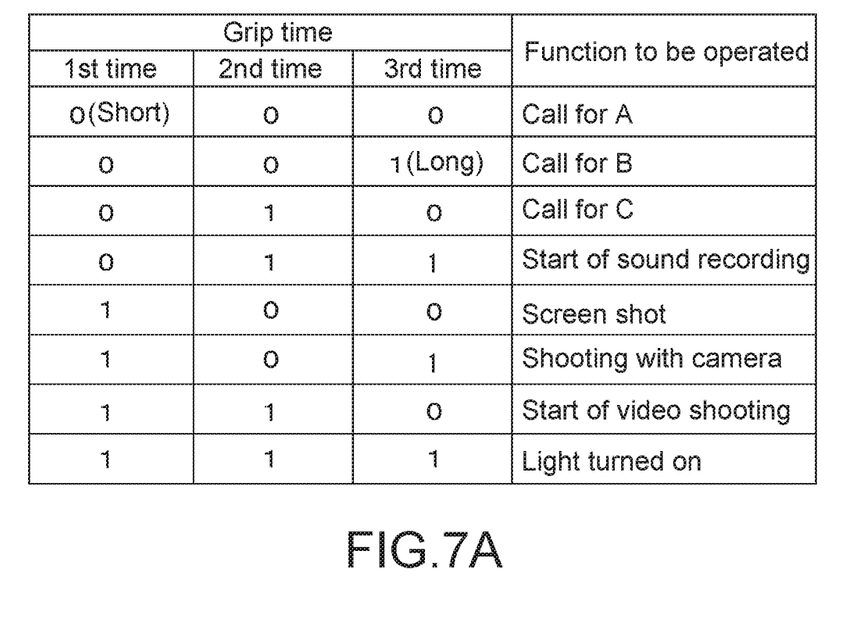
FIG. 7A is a correspondence table illustrating an example of a relationship between a grip pattern and a function of the apparatus body.
Figure 7B:
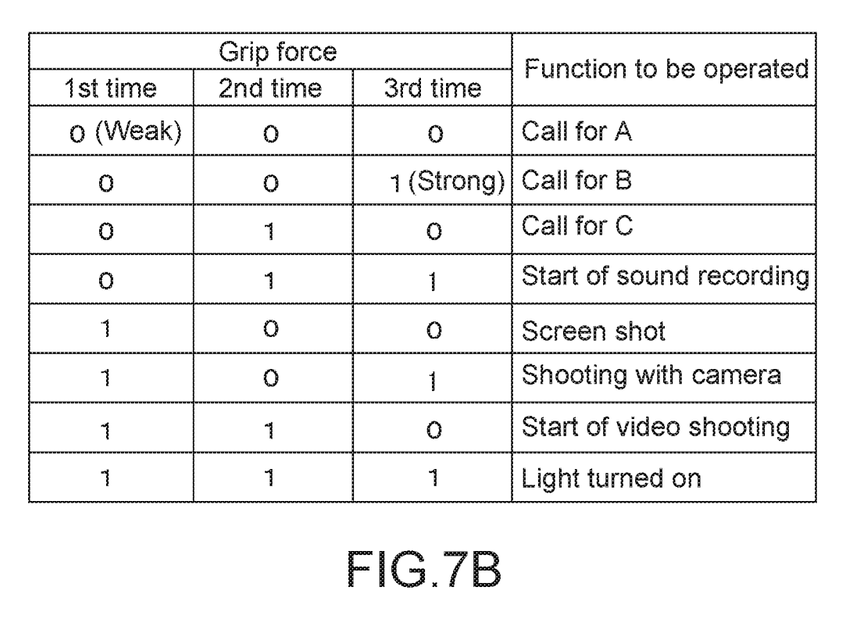
FIG. 7B is a correspondence table illustrating an example of a relationship between a grip pattern and a function of the apparatus body.

FIGS. 7A and 7B are correspondence tables illustrating an example of a relationship between a grip pattern and a function of the apparatus body 10. FIG. 7A illustrates a correspondence relationship in which a grip time in a grip manipulation is used as a detection parameter, and FIG. 7B illustrates a correspondence relationship in which a grip force in a grip manipulation is used as a detection parameter.

In FIG. 7A, "0" corresponds to "short press" representing a short-grip time, and "1" corresponds to "long press" representing a long-grip time. In the example of FIG. 7A, a function of "call for A" is activated when all of the three grip times exhibit "short press", and a function of "call for B" is activated when the first-time grip time and the second-time grip time exhibit "short press" and the third-time grip time exhibits "long press". Likewise, a function of "image-capturing with camera" using the image-capturing section 16 is activated when the first-time grip time exhibits "long press", the second-time grip time exhibits "short press", and the third-time grip time exhibits "long press". Further, "start of sound recording", "screen shot", "start of video shooting", "light turned on", and the like are allocated according to the grip pattern. These functions are examples, and additions or modifications may be made thereto as appropriate according to the type of the electronic apparatus 100 or the taste of a user.

In FIG. 7B, "0" corresponds to "gentle grip" representing a weak grip force, and "1" corresponds to "tight grip" representing a strong grip force. In the example of FIG. 7B, the function of "call for A" is activated when all of the three grip forces exhibit "gentle grip", and the function of "call for B" is activated when the first-time grip force and the second-time grip force exhibit "gentle grip", and the third-time grip force exhibits "tight grip". Likewise, the function of "image-capturing with camera" using the image-capturing section 16 is activated when the first-time grip force exhibits "tight grip", the second-time grip force is "gentle grip", and the third-time grip force exhibits "tight grip.

The correspondence relationships between a grip pattern and a function are stored in the storage 30. In this case, the length and the magnitude of a grip manipulation are each encoded with "0" and "1", the two values described above.

Not only a grip pattern with one of a grip time or a grip force, but also a grip pattern with a combination thereof may be applied. This makes it possible to combine functions or expand the functionality.

<Operation of Electronic Apparatus>

Next, the controller 40 is described in detail together with a typical operation of the electronic apparatus 100.

Operation Example 1

Figure 8:
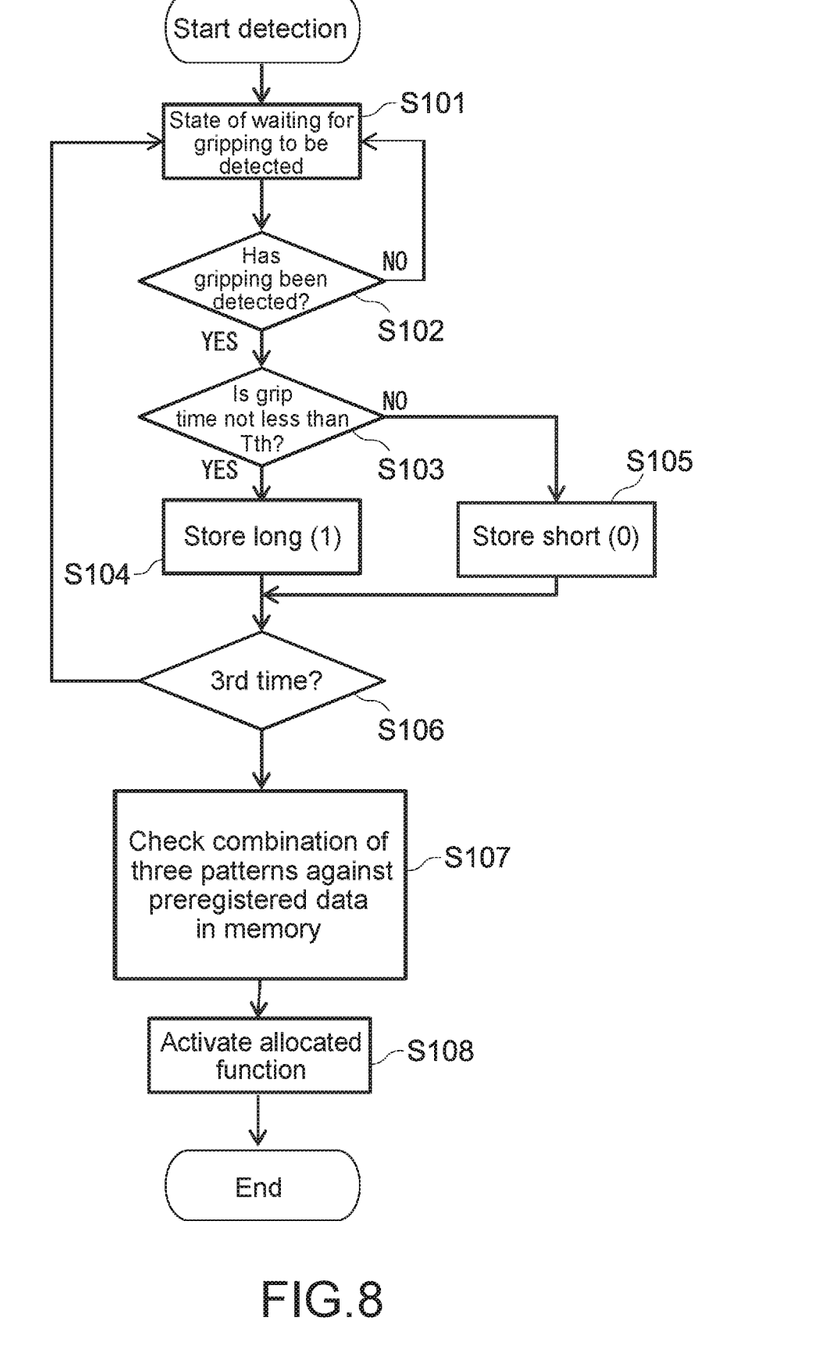
FIG. 8 is a flowchart illustrating an example of a procedure of processing performed by a controller of the electronic apparatus.

FIG. 8 is a flowchart illustrating an example of a procedure of processing performed by the controller 40. In this example, a procedure of a control that determines an operation of the electronic apparatus 100 is described using the correspondence table illustrated in FIG. 7A.

For example, the controller 40 executes a dedicated application to activate a mode of detecting a grip pattern for waiting for a grip manipulation of a user (S101).

The controller 40 (the determination section 41) measures a holding force on the electronic apparatus 100 according to an output from the pressure detector 20. When the holding force is not less than the first threshold Th1, the controller 40 determines that a holding operation of the user is a grip manipulation and measures a grip time (S102, S103). When the grip time is not less than the threshold Tth, the controller 40 determines that the grip time exhibits "long press" and stores a code "1" in the storage 30, and when the grip time is less than the threshold Tth, the controller 40 determines that the grip time exhibits "short press" and stores a code "0" in the storage 30 (S104, S105). The controller 40 repeats the processes described above three times (S106).

The controller (the checkup section 42) chronologically reads the three codes stored in the storage 30, and checks the three codes against grip patterns that correspond to various functions and are stored in the storage 30 in advance (S107). When the input three codes correspond to one of the grip patterns in the storage 30, the controller 40 generates a control instruction for activating an operation allocated to the corresponding grip pattern (S108).

As described above, the electronic apparatus 100 of the present embodiment makes it possible to perform a specified input manipulation by a specified grip manipulation being performed with respect to the apparatus body 10. This makes it possible to provide a desired function using a simpler manipulation without the necessity of performing a touch manipulation with respect to the display section 13.

Although there exists sound recognition as an input method other than a touch manipulation performed on the display section 13, it is not suitable to use the sound recognition under a circumstance in which the production of sound is to be avoided. Further, although there exists a method for manipulating a physical button while feeling around for the physical button, there is a possibility that it is not possible to manipulate the button accurately by feeling around for an apparatus in a pocket or a bag without a visual confirmation.

On the other hand, the present embodiment makes it possible to provide an intended function just by performing a grip manipulation with respect to the apparatus body 10, and thus to perform an accurate manipulation without visually confirming the apparatus body 10.

Further, the present embodiment makes it possible to determine a grip manipulation performed with respect to any position, since the pressure detector 20 is provided almost all over the peripheral surface 12 (the long sides 121). This makes it possible to perform a simple and accurate input manipulation just by gripping any position.

The function performing mode with a grip time being used as a detection parameter, has been described above, but it is not limited to this. The function performing mode with a grip force being used as a detection parameter, as illustrated in FIG. 7B, may be used.

Operation Example 2

Figure 9:
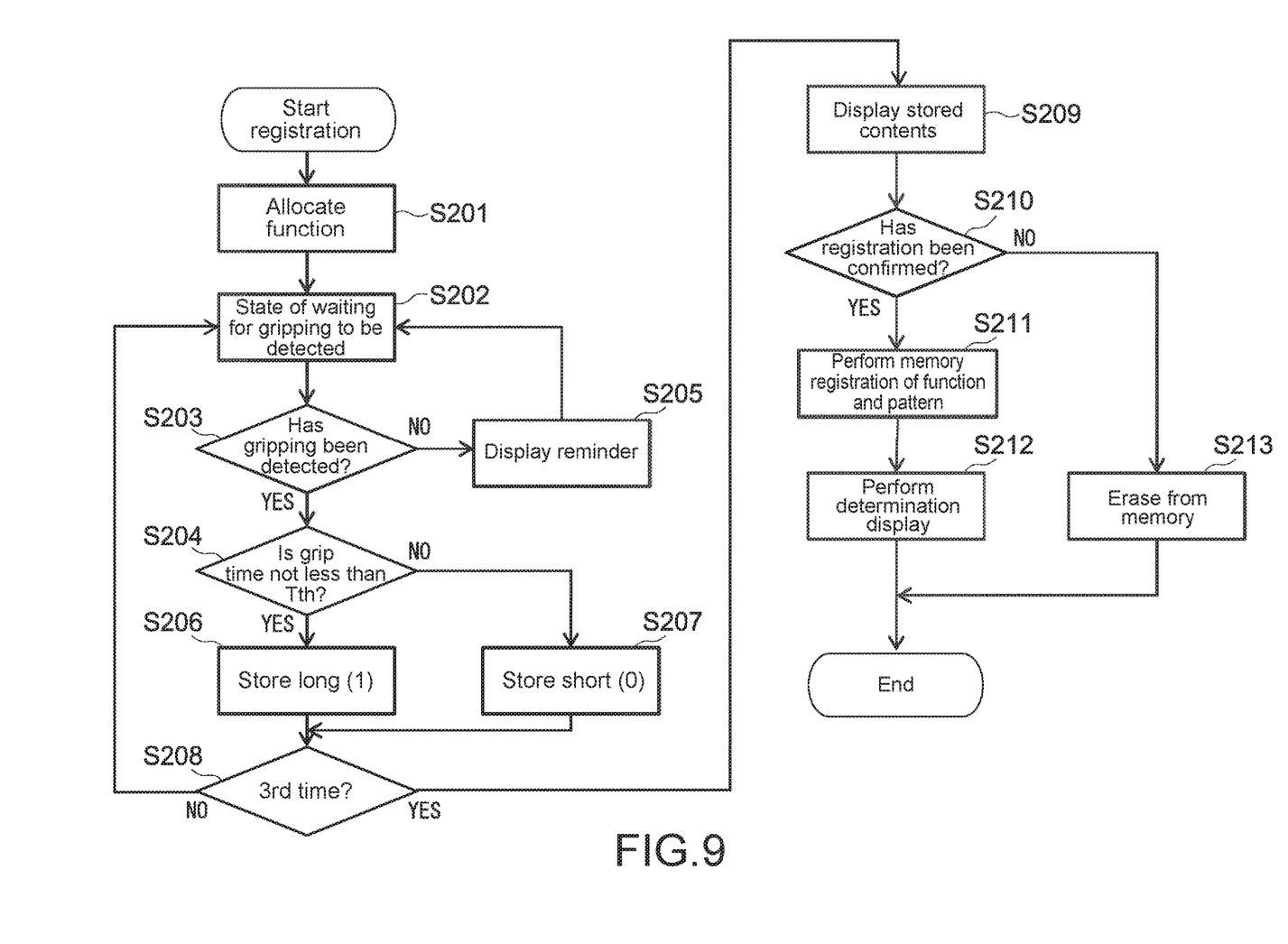
FIG. 9 is a flowchart illustrating an example of a procedure of processing for setting a function that is performed by the controller.

Next, a method for setting a function of the electronic apparatus 100 that is activated by a grip manipulation being performed, is described. FIG. 9 is a flowchart illustrating an example of a procedure of processing for setting a function that is performed by the controller 40.

First, in the controller 40, a function that is to be allocated by a registration is specified in a function registration mode (S201). The function to be specified is determined by a user performing manipulation of selecting the function from a list of functions displayed on the display section 13.

Next, the controller 40 enters into a grip-manipulation detecting mode for accepting a grip manipulation allocated to the specified function (S202). In this example, as in the case of FIG. 7A, the case in which the grips times in three grip manipulations (long press or short press) are used as registration parameters, is described, but the number of times (the number of digits) is not limited to this. Further, instead of, or in addition to the grip time, the grip force (strong or weak) may be used as a registration parameter.

The controller 40 detects a grip time when the controller 40 detects a grip manipulation (S203, S204). When the grip manipulation has not been detected for a specified time period, the controller 40 displays, on the display section 13, a message to encourage the user to perform a grip manipulation (S205). Regarding such a display of reminder, a warning beep may be emitted from the speaker 18 instead of, or in addition to the screen display.

When the grip time is not less than the threshold Tth, the controller 40 determines that the grip time exhibits "long press" and stores the code "1" in the storage 30, and when the grip time is less than the threshold Tth, the controller 40 determines that the grip time exhibits "short press" and stores the code "0" in the storage 30 (S206, S207). The controller 40 repeats the processes described above three times (S208).

After the controller 40 determines the three grip times, the controller 40 displays each code (grip pattern) stored in the storage 30 on the display section 13 (S209). When the user performs a registration confirmation, the controller 40 stores the grip pattern in the storage 30 in association with a preselected function, and displays a determination of registered contents on the display section 13 (S210, 5211, and S212). On the other hand, when the registration confirmation has not been performed (or when a registration has been rejected), the controller 40 erases the grip pattern from the storage 30 (S213).

As described above, the present embodiment makes it possible to perform a discretionary customization to associate a grip pattern with a function, and thus to set a grip pattern depending on the taste of a user.

This operation example is also applicable to setting of an authentication password for logging in to the electronic apparatus 100.

Second Embodiment

Figure 10:
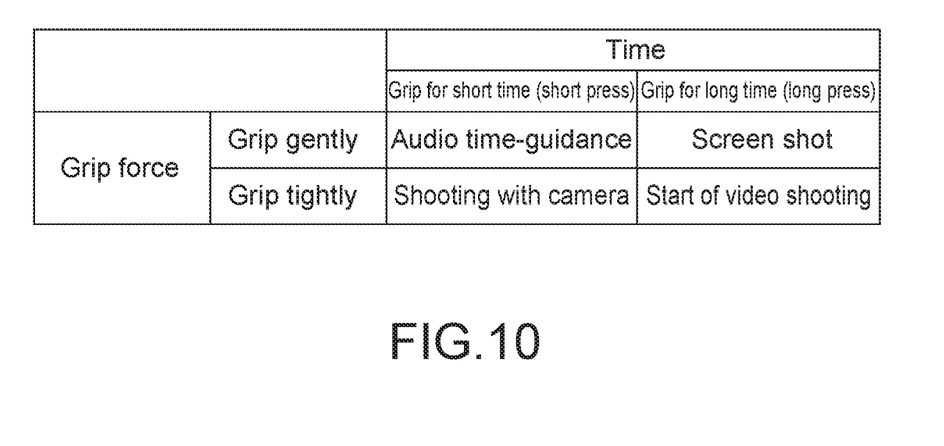
FIG. 10 illustrates an example of a correspondence relationship between a grip pattern and a function in the electronic apparatus according to a second embodiment of the present technology.

FIG. 10 illustrates an example of a correspondence relationship between a grip pattern and a function in the electronic apparatus according to a second embodiment of the present technology.

A component different from that of the first embodiment is primarily described below. The same components as those of the first embodiment will be denoted by the same reference symbols and descriptions thereof will be omitted or simplified.

In the present embodiment, the grip pattern includes two detection parameters of a grip force and a grip time, and four functions are allocated to combinations of a strong or weak grip force and a long or short grip time in a single grip manipulation. The strong or weak grip force is determined on the basis of the second threshold Th2 described above (refer to FIG. 6), and the long or short grip time is determined on the basis of the threshold Tth described above.

As illustrated in FIG. 10, audio time-guidance is activated when the grip force is weak with a long press, and a screen shot is activated when the grip force is weak with a short press. On the other hand, shooting with a camera is activated when the grip force is strong with a long press, and video shooting is started when the grip force is strong with a short press. These functions are just examples, and the function can be changed as appropriate depending on the type of the electronic apparatus 100 or the taste of a user.

The present embodiment makes it possible to perform a desired function quickly without making a request for a user to perform a plurality of grip manipulations, since it is possible to perform a manipulation of selecting a function according to a grip force and a grip time in a single grip manipulation.

The combination is not limited to this, and grip forces and grip times in multiple grip manipulations may be combined. This makes it possible to further expand the selectable functionality. Further, the use of the present technology for inputting or setting an authentication password results in a further improvement in security.

Third Embodiment

Figure 11:
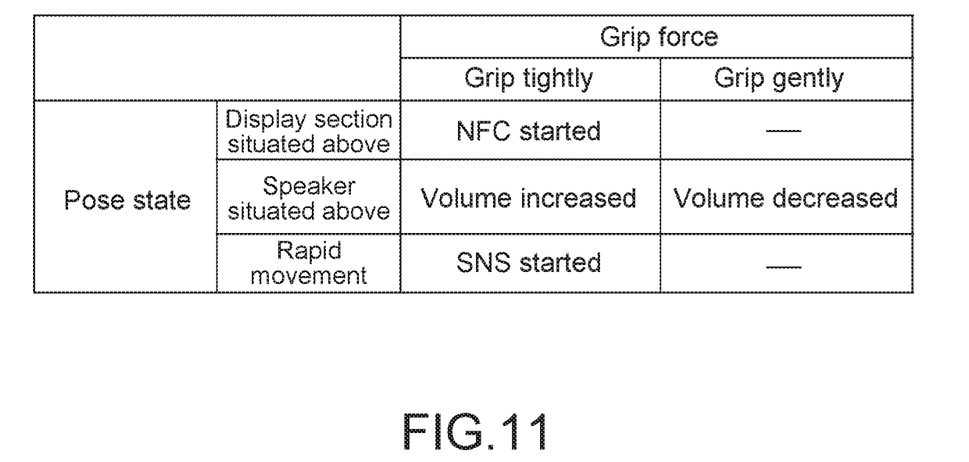
FIG. 11 illustrates an example of a correspondence relationship between a grip pattern and a function in the electronic apparatus according to a third embodiment of the present technology.

FIG. 11 illustrates an example of a correspondence relationship between a grip pattern and a function in the electronic apparatus according to a third embodiment of the present technology.

A component different from that of the first embodiment is primarily described below. The same components as those of the first embodiment will be denoted by the same reference symbols and descriptions thereof will be omitted or simplified.

The present embodiment is different from the first embodiment in that an operation of the apparatus body 10 is controlled according to an output from the pressure detector 20 (grip pattern) and an output from the motion sensor 15 (information regarding a pose of the apparatus body 10). Examples of the information regarding a pose of the apparatus body 10 include pose states (upward, downward, face-up, face-down, in a stationary state, and in a moving state) of the apparatus body 10 based on the output from the motion sensor 15 such as an output from an acceleration sensor.

Figure 12:
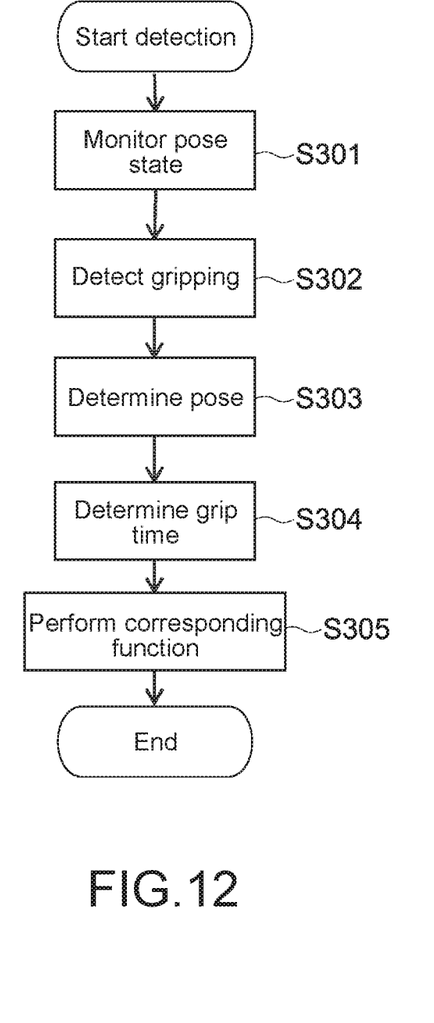
FIG. 12 is a flowchart illustrating an example of a procedure of processing performed by the controller of the electronic apparatus.

FIG. 12 is a flowchart illustrating an example of a procedure of processing performed by the controller 40 in the present embodiment.

While monitoring a pose state of the apparatus body 10, the controller 40 detects whether there is a grip manipulation with respect to the apparatus body 10 (the peripheral surface 12) according to an output from the motion sensor 15 (S301, S302). When the controller 40 detects a grip manipulation, the controller 40 determines both the pose state of the apparatus body 10 at that time and the grip time of the grip manipulation (S303, S304). The controller 40 performs a function corresponding to a result of the determinations (S305).

In the present embodiment, in a state in which the display section 13 of the apparatus body 10 is oriented upward (a pose of being laid face-up), Near-field radio communication (NFC) is started when the grip force exhibits a value not less than a specified value, as illustrated in FIG. 11. Such a function can be performed when the electronic apparatus 100 is used as a contactless communication tag, such as when passing through an automated ticket gate or making payment at a shop.

In the present embodiment, in a state in which the speaker 18 of the apparatus body 10 is oriented upward, the volume of the speaker 18 is increased when the grip force exhibits a value not less than a specified value, and the volume of the speaker 18 is decreased when the grip force exhibits a value less than a specified value. Such functions can be performed, for example, during a call using the electronic apparatus 100. Further, in the present embodiment, a social networking system (SNS) is started, for example, when gripping the apparatus body 10 tightly while moving the apparatus body 10 rapidly, such as when shaking the apparatus body 10 up and down.

As described above, the combination use of a grip parameter and a pose state of the apparatus body makes it possible to provide a form of a manipulation input, such as a gesture input. This makes it possible to provide various input forms and to expand corresponding functionality.

Modifications

Although the embodiments of the present technology have been described above, of course the present technology is not limited only to the embodiments described above and various modifications may be made thereto.

For example, in the embodiments described above, the structure illustrated in FIGS. 4 and 5 is used for the pressure detector 20, but the structure of the pressure detector 20 is not limited to this. The number of metal layers having a ground potential may typically be one. In a smallest configuration, a sensor itself even does not have to include a metal layer, since a metallic housing can replace the metal layer as a modified metal layer.

Figure 13A:
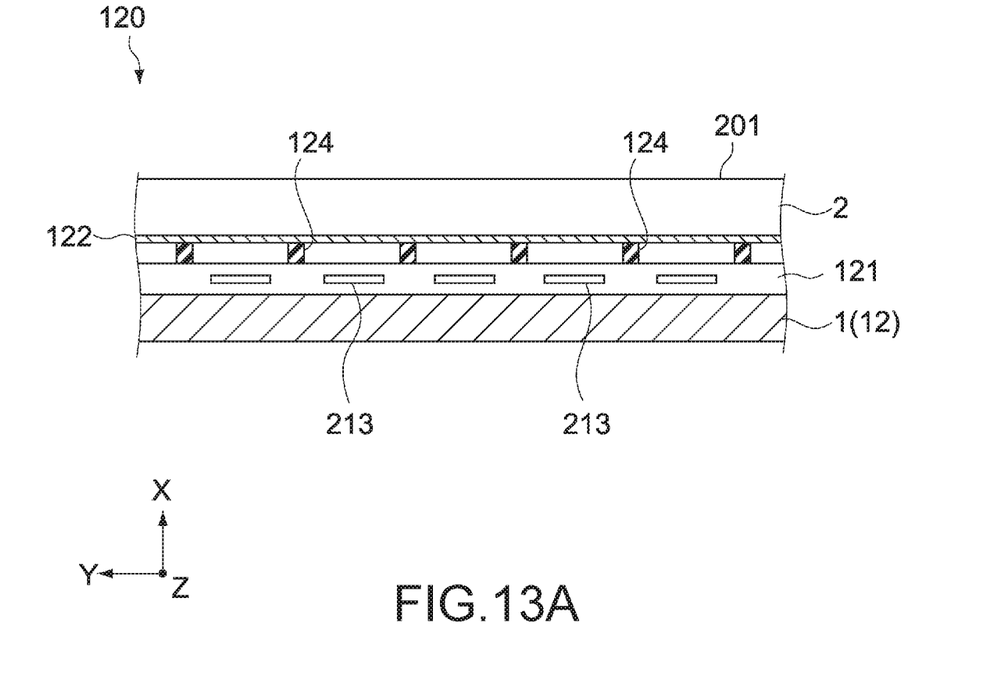
FIG. 13A is a primary-portion cross-sectional view schematically illustrating another example of a configuration of the pressure detector.
Figure 13B:
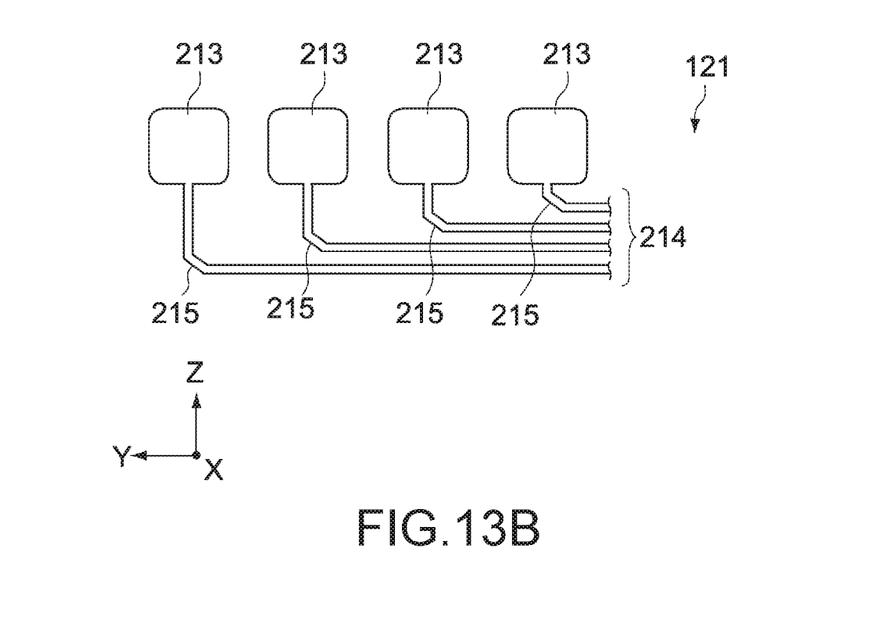
FIG. 13B is a schematic plan view of an electrode structure of the pressure detector of FIG. 13A.

The mutual-capacitance sensor is used for the pressure detector 20, but a self-capacitance sensor may be used instead. FIG. 13A is a primary-portion cross-sectional view schematically illustrating a pressure detector 120 that includes a self-capacitance sensor, and FIG. 13B is a schematic plan view of an electrode structure of the pressure detector 120.

As illustrated in FIG. 13A, the pressure detector 120 is provided between the housing 1 (the peripheral surface 12 of the apparatus body 10) and the protection cover 2. The pressure detector 120 includes a circuit board 121, a metal layer 122, and a support 124. As illustrated in FIG. 13B, the circuit board 121 includes, as capacitive elements, a plurality of detection electrodes 213 arranged in the Y-axis direction. Each detection electrode 213 is electrically connected to the controller 40 through a wiring portion 214. In order to prevent the concentration of the electric field, it is desirable that each detection electrode 213 have a shape of a planar circle or rectangle and be formed to have tapered or rounded four corners, as illustrated in the figure. Likewise, it is also desirable that curved portions 215 in the wiring portion 214 be formed to be curved not at a right angle, but to be curved at, for example, an angle of 45 degrees by step by step, as illustrated in the figure.

The metal layer 122 is formed of metallic foil, such as copper foil, that is fixed to an inner surface of the protection cover 2. The supports 124 are constituted of a plurality of columns elastically deformable in the X-axis direction. The support 124 is arranged between the metal layer 122 and the circuit board 121.

The self-capacitance sensor is a scheme for measuring the proximity of a ground electrode of, for example, a human body or a metallic plate, using a change in capacitance in each detection electrode 213, and is generally used for a capacitive touch switch. As a pressure sensor, it is also considered a capacitor whose shape is changed due to pressure. The capacitance in the detection electrode 213 looks increased due to the proximity of the grounded human body or metallic plate. Regarding wiring to a detection electrode for which a change in capacitance is measured, the number of pieces of wiring that is equal to the number of detections to be separately performed is necessary for the self-capacitance sensor. A change in capacitance can be easily designed using the area, the distance, and the permittivity between a ground electrode (the metal layer 122) and a detection electrode (the detection electrode 213).

In addition to the sensor using a change in capacitance, a sensor using a change in resistance, a sensor using a change in magnetic field due to metallic deformation, a sensor using a piezoelectric effect, and the like can be used as a pressure sensor.

In the embodiments described above, the examples of applying the present technology to a smartphone that is an electronic apparatus have been described. However, the application is not limited to this, and the present technology is also applicable to other electronic apparatuses such as a portable music player. In this case, it is possible to, for example, select a musical number and adjust the volume of sound just by performing a grip manipulation with respect to an apparatus body without using a dedicated controller.

Further, in the embodiments described above, the grip time and the grip force are used as a detection parameter of a grip manipulation. However, the detection parameter is not limited to this, and, for example, a change in grip position (a change in pressure distribution) and a tap manipulation (an instantaneous output from a pressure detector) may be included as a detection parameter.

Note that the present technology may also take the following configurations.

(1) An electronic apparatus including:
an apparatus body that includes a principal surface, and a peripheral surface that is held by a user;
a pressure detector that is arranged on the peripheral surface, and detects a holding force that acts on the peripheral surface; and
a controller that controls an operation of the apparatus body according to a temporal change in the holding force detected by the pressure detector.

(2) The electronic apparatus according to (1), further including a storage that stores therein a pattern of the temporal change in the holding force associated with the operation of the apparatus body, in which
the controller includes
a determination section that determines whether there is a grip manipulation with respect to the apparatus body according to an output from the pressure detector, and
a checkup section that checks the grip manipulation against the pattern of the temporal change, the pattern of the temporal change corresponding to the grip manipulation.

(3) The electronic apparatus according to (2), in which the pattern of the temporal change includes information regarding a manipulation time of the grip manipulation.

(4) The electronic apparatus according to (2) or (3), in which the pattern of the temporal change includes information regarding a pressing force of the grip manipulation.

(5) The electronic apparatus according to any one of (1) to (4), further including an acceleration detector that detects an acceleration that acts on the apparatus body, in which
the controller controls the operation of the apparatus body according to an output from the pressure detector and an output from the acceleration detector.

(6) The electronic apparatus according to any one of (1) to (5), in which
the pressure detector includes an electrostatic pressure-sensitive sensor that includes a plurality of capacitive elements arranged along the peripheral surface.

(7) The electronic apparatus according to any one of (1) to (6), in which
the apparatus body further includes a display section that is arranged on the principal surface.

(8) An information processing device including:
a determination section that determines whether there is a grip manipulation with respect to an apparatus body according to an output from a pressure detector that detects a holding force that acts on the apparatus body;
a storage that stores therein a pattern of a temporal change in the holding force associated with an operation of the apparatus body; and
a checkup section that checks the grip manipulation against the pattern of the temporal change, the pattern of the temporal change corresponding to the grip manipulation.

(9) An information processing method including:
determining whether there is a grip manipulation with respect to an apparatus body according to an output from a pressure detector that detects a holding force that acts on the apparatus body;
checking the grip manipulation against a pattern of a temporal change in the holding force associated with an operation of the apparatus body; and
generating a control signal that starts the operation corresponding to the pattern of the temporal change in the holding force.

REFERENCE SIGNS LIST 10 apparatus body
11 principal surface
12 peripheral surface
13 display section
20 pressure detector
30 storage
40 controller
41 determination section
42 checkup section
100 electronic apparatus

The invention claimed is:
1. An electronic apparatus comprising:
an apparatus body that includes a principal surface, and a peripheral surface that is held by a user;

a pressure detector that is arranged on a pair of long sides of the peripheral surface, and detects a holding force that acts on the peripheral surface on both of the long sides; and a controller that controls an operation of the apparatus body according to a temporal change in the holding force detected by the pressure detector, the temporal change detected based on a single grip manipulation including a plurality of press positions on one of the long sides, a first press position of the plurality of press positions on the one long side having a length of manipulation time below a time threshold and a second press position of the plurality of press positions on the one long side having a length of manipulation time above the time threshold, wherein the pressure detector includes a circuit board having a plurality of detection electrodes included therein, a metal layer, and a plurality of supports provided between the circuit board and the metal layer, each of the plurality of detection electrodes included in the circuit board having a first support of the plurality of supports in contact with the metal layer and the circuit board on a first side, and a second support of the plurality of supports in contact with the metal layer and the circuit board on a second side opposite the first side.

2. The electronic apparatus according to claim 1, further comprising a storage that stores therein a pattern of the temporal change in the holding force associated with the operation of the apparatus body, wherein the controller includes
- a determination section that determines whether there is a grip manipulation with respect to the apparatus body according to an output from the pressure detector, and
- a checkup section that checks the grip manipulation against the pattern of the temporal change, the pattern of the temporal change corresponding to the grip manipulation.

3. The electronic apparatus according to claim 2, wherein the pattern of the temporal change includes information regarding a manipulation time of the grip manipulation.

4. The electronic apparatus according to claim 2, wherein the pattern of the temporal change includes information regarding a pressing force of the grip manipulation.

5. The electronic apparatus according to claim 1, further comprising an acceleration detector that detects an acceleration that acts on the apparatus body, wherein
the controller controls the operation of the apparatus body according to an output from the pressure detector and an output from the acceleration detector.

6. The electronic apparatus according to claim 1, wherein the pressure detector includes an electrostatic pressure-sensitive sensor that includes a plurality of capacitive elements arranged along the peripheral surface.

7. The electronic apparatus according to claim 1, wherein the apparatus body further includes a display section that is arranged on the principal surface.

8. An information processing device comprising:
a determination section that determines whether there is a grip manipulation with respect to an apparatus body, which includes a peripheral surface, according to an output from a pressure detector that detects a holding force that acts on the apparatus body, wherein the pressure detector is arranged on a pair of long sides of the peripheral surface and includes a circuit board having a plurality of detection electrodes included therein, a metal layer, and a plurality of supports provided between the circuit board and the metal layer, each of the plurality of detection electrodes included in the circuit board having a first support of the plurality of supports in contact with the metal layer and the circuit board on a first side, and a second support of the plurality of supports in contact with the metal layer and the circuit board on a second side opposite the first side;

a storage that stores therein a pattern of a temporal change in the holding force associated with an operation of the apparatus body; and a checkup section that checks the grip manipulation against the pattern of the temporal change, the pattern of the temporal change corresponding to the grip manipulation, the temporal change detected based on a single grip manipulation including a plurality of press positions on one of the long sides, a first press position of the plurality of press positions on the one long side having a length of manipulation time below a time threshold and a second press position of the plurality of press positions on the one long side having a length of manipulation time above the time threshold.

9. An information processing method comprising:
determining whether there is a grip manipulation with respect to an apparatus body, which includes a peripheral surface, according to an output from a pressure detector that detects a holding force that acts on the apparatus body, wherein the pressure detector is arranged on a pair of long sides of the peripheral surface and includes a circuit board having a plurality of detection electrodes included therein, a metal layer, and a plurality of supports provided between the circuit board and the metal layer, each of the plurality of detection electrodes included in the circuit board having a first support of the plurality of supports in contact with the metal layer and the circuit board on a first side, and a second support of the plurality of supports in contact with the metal layer and the circuit board on a second side opposite the first side;

checking the grip manipulation against a pattern of a temporal change in the holding force associated with an operation of the apparatus body, the temporal change detected based on a single grip manipulation including a plurality of press positions on one of the long sides, a first press position of the plurality of press positions on the one long side having a length of manipulation time below a time threshold and a second press position of the plurality of press positions on the one long side having a length of manipulation time above the time threshold; and generating a control signal that starts the operation corresponding to the pattern of the temporal change in the holding force.

10. The electronic apparatus according to claim 1, wherein
the time threshold is used to determine whether pressure detected at each of the first press position and the second press position detect is a short press or a long press.

11. The electronic apparatus according to claim 1, wherein
the controller controls the operation of the apparatus body according to the temporal change in the single grip manipulation and a pose state of the apparatus body when the single grip manipulation occurs.

* * * * *